United States Patent
Olsen et al.

(10) Patent No.: US 10,154,565 B1
(45) Date of Patent: Dec. 11, 2018

(54) LIGHTING SYSTEM WITH AMBIENT LIGHT COMPENSATION

(71) Applicant: DELTA T CORPORATION, Lexington, KY (US)

(72) Inventors: Jonathan William Wiley Olsen, Lexington, KY (US); Stephen Alexander Harper, Lexington, KY (US); Adam Glenn Tucker, Georgetown, KY (US); Thomas James Lesser, Lexington, KY (US); James Tristan Miller, Lexington, KY (US); Mitchell Thomas Kiser, Richmond, KY (US); Marcus Landon Borders, Lexington, KY (US); Warner Lee Wells, Versailles, KY (US); Kristjen Ejvind Kjems, Lexington, KY (US); Jason Robert Bishop, Nicholasville, KY (US); Paul Frederick Wigler, Lexington, KY (US)

(73) Assignee: DELTA T, LLC, Lexington, KY (US)

( * ) Notice: Subject to any disclaimer, the term of this patent is extended or adjusted under 35 U.S.C. 154(b) by 0 days.

(21) Appl. No.: 15/635,757

(22) Filed: Jun. 28, 2017

Related U.S. Application Data

(60) Provisional application No. 62/355,633, filed on Jun. 28, 2016.

(51) Int. Cl.
*H05B 33/08* (2006.01)
*H05B 37/02* (2006.01)

(52) U.S. Cl.
CPC ..... *H05B 37/0218* (2013.01); *H05B 33/0845* (2013.01)

(58) Field of Classification Search
None
See application file for complete search history.

(56) References Cited

U.S. PATENT DOCUMENTS

| | | | |
|---|---|---|---|
| 2012/0299485 A1* | 11/2012 | Mohan | H05B 37/0218 315/153 |
| 2013/0154512 A1* | 6/2013 | Covaro | H02J 13/0003 315/297 |

* cited by examiner

Primary Examiner — Dedei K Hammond
(74) Attorney, Agent, or Firm — King & Schickli, PLLC

(57) ABSTRACT

A lighting system comprises a plurality of lights, a sensor for measuring a light level associated with each light, and at least one controller for generating a light output from at least one light of the plurality of lights. The controller is adapted for adjusting the light output from the at least one light by an incremental amount to bring the measured light level closer to a target light level, which may correspond to an overall brightness for the space including the lights. Related methods are also disclosed.

18 Claims, 6 Drawing Sheets

LIGHTING SYSTEM WITH AMBIENT LIGHT COMPENSATION

This is application claims the benefit of U.S. Provisional Patent Application Ser. No. 62/355,633, the disclosure of which is incorporated herein by reference.

TECHNICAL FIELD

This application relates to the lighting arts and, in particular, a lighting system with ambient light compensation.

BACKGROUND

With increased interest in energy conservation and energy awareness, various controls have been implemented for appliances, fixtures, and other electrical components to regulate energy usage and/or to maintain ideal operating conditions. With respect to lighting fixtures in particular, the amount of ambient light within a given space may be considered in determining ideal operating conditions. For example, an area of a room close to a window may receive more light than an area away from a window. In addition, the amount of light that may enter the room through said window may vary throughout a given day. Furthermore, a user may desire some degree of control of light level and/or uniformity between a plurality of lights within a given space, each of which being exposed to varying degrees of ambient light.

Accordingly, a system and method are disclosed herein to address these concerns within the context of an automated lighting system.

SUMMARY

According to a first aspect of the disclosure, a lighting system comprises a plurality of lights for illuminating a space, a sensor for measuring a light level associated with each light, and at least one controller for generating a light output from at least one light of the plurality of lights. The controller is adapted for adjusting the light output from the at least one light by an incremental amount to bring the measured light level closer to a target light level.

The target light level may be provided to the controller by a user. The controller may generate the light output based on a correlation between the measured light level and light output. The controller may also be adapted for determining a global minimum light output, and adjusting the light output for the at least one light to be greater than the global minimum light output. In one alternative, each light may include a controller for implementing the control, so that no central controller is required.

This disclosure also pertains to a method of controlling a light. The method comprises providing a target light level, obtaining a measured light level associated with the light, and adjusting the light output from the light by an incremental amount to bring the measured light level closer to the target light level. The method may further include the step of initiating a light output from the light based on a correlation between a measured light level and light output.

The adjusting step may comprise continuously adjusting the light output by a series of incremental amounts. The method may also involve adjusting the incremental amount by multiplying the incremental amount by a damping factor when a difference between the measured light level at the light fixture and the targeted light level falls below a predetermined value (e.g. approximately 30% of the maximum light output capability). The damping factor may be defined as the minimum of 1 and the following function:

$$\left(\frac{1}{(30\% \text{ of maximum light output capability})} * |x|\right) + 0.1$$

where "x" is the incremental amount.

A further aspect of the disclosure pertains to a method of controlling a plurality of lights in a space. The method comprises providing a target light level, initiating a first light output from each of the plurality of lights based at least in part on a correlation between measured light level and light output, determining a measured light level at each of the lights, and determining a nominal light output for each of the plurality of lights needed to bring the measured light level at the plurality of lights closer to the target light level. The method may further include the step of determining the nominal light output by increasing the first light output by an incremental amount, wherein the incremental amount is a difference between a light output correlating to the target light level and a light output correlating to the measured light level.

Still further, the method may involve determining a maximum of the nominal light outputs from the plurality of lights, and initiating a second light output from each of the lights, each of said second light outputs being a maximum of the nominal light output for each of said plurality of lights and a predetermined fraction of the maximum nominal light outputs. The method may also comprise the steps of: (a) determining a global minimum light output; and (b) adjusting an initiated first light output or a second light output to be no less than the global minimum light output (as a function of the measured light level or the an average light output for the plurality of lights).

BRIEF DESCRIPTION OF THE DRAWING FIGURES

The following description of certain examples of the invention are provided for purposes of understanding the disclosure, and should not be used to limit the scope of the invention. Other examples, features, aspects, embodiments, and advantages of the invention will become apparent to those skilled in the art from the following description, which includes by way of illustration, one or more of the best modes contemplated for carrying out the invention. As will be realized, the invention is capable of other different and obvious aspects, all without departing from the invention.

Accordingly, the drawings and descriptions should be regarded as illustrative in nature and not restrictive.

DETAILED DESCRIPTION

Figure 1:
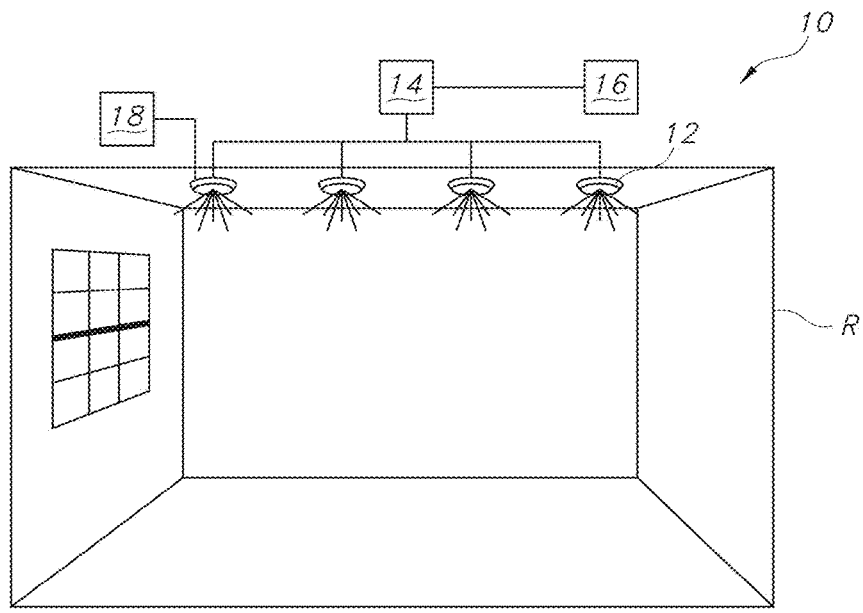
FIG. 1 illustrates one possible environment of use for aspects of the current disclosure.

This disclosure relates to controlling lighting by providing an ambient light compensation (ALC) capability for adjusting light output based at least partially on a measured light input. As an example, FIG. 1 represents a possible environment of use for a lighting system 10 in a space, such as a room R. The system 10 may include one or more lights or lighting fixtures 12 (which terms may be used interchangeably for purposes of this disclosure without the intention of creating any limitation on scope) which provide light to the room R, possibly in connection with ambient light (such as from other light sources not forming part of the system 10, including possibly natural lighting sources). The lights or fixtures 12 each which may be associated with a central controller 14 for implementing control of the light output by the lights or fixtures according to the system 10 (but, as discussed below, the controller 14 may also be considered optional, as the lights may include individual controllers that perform the same functions in terms of implementing the ALC feature).

Figure 2:
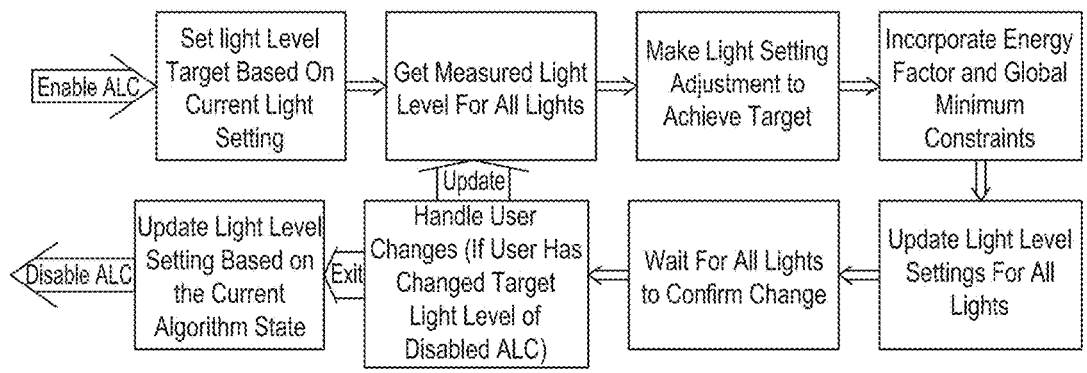
FIG. 2 is a flow diagram illustrating the basic implementation of the ambient light compensation algorithm.

FIG. 2 reflects a flow diagram illustrating the overall aspects of the ALC feature. In particular, a user may enable the ALC feature by issuing a corresponding command to the system 10, which may be done via wireless communication sent from a remote control 16, as indicated in FIG. 1, or possibly via a wired connection. Upon being enabled, a desired room brightness may be set as a target light level based upon a current light setting, which setting may be selected by the user. The system 10 may then obtain a measured light value for the lights, such as using one or more associated light sensors 18 (which may be remote from the fixture 12 or connected thereto), and make a light setting adjustment to each light in order to bring the measured light level closer to and thus more in line with the target light level.

The system 10 may also implement controls (such as an energy factor and/or global minimum constraints, as discussed below) that place upper or lower limits on the light output of a given light or lighting fixture 12. Light level settings may then be updated for all lights or fixtures 12 within a given system 10 based on the controls provided. The system 10, such as by way of the central controller 14 interacting with the associated sensor(s) 18, may then await confirmation that all lights/fixtures 12 have changed the light level settings accordingly.

Upon updating of the light level settings, the system 10 may also account for any requested changes, such as a user altering the desired room brightness/target light level or disabling the ALC feature. If the user has updated the target light level, then the system 10 may again begin the cycle of obtaining measured light levels, making adjustments, and so on, as indicated previously. If the user disables the ALC feature, then the current light level would be updated as the target light level for future use of the ALC feature.

Figure 3:
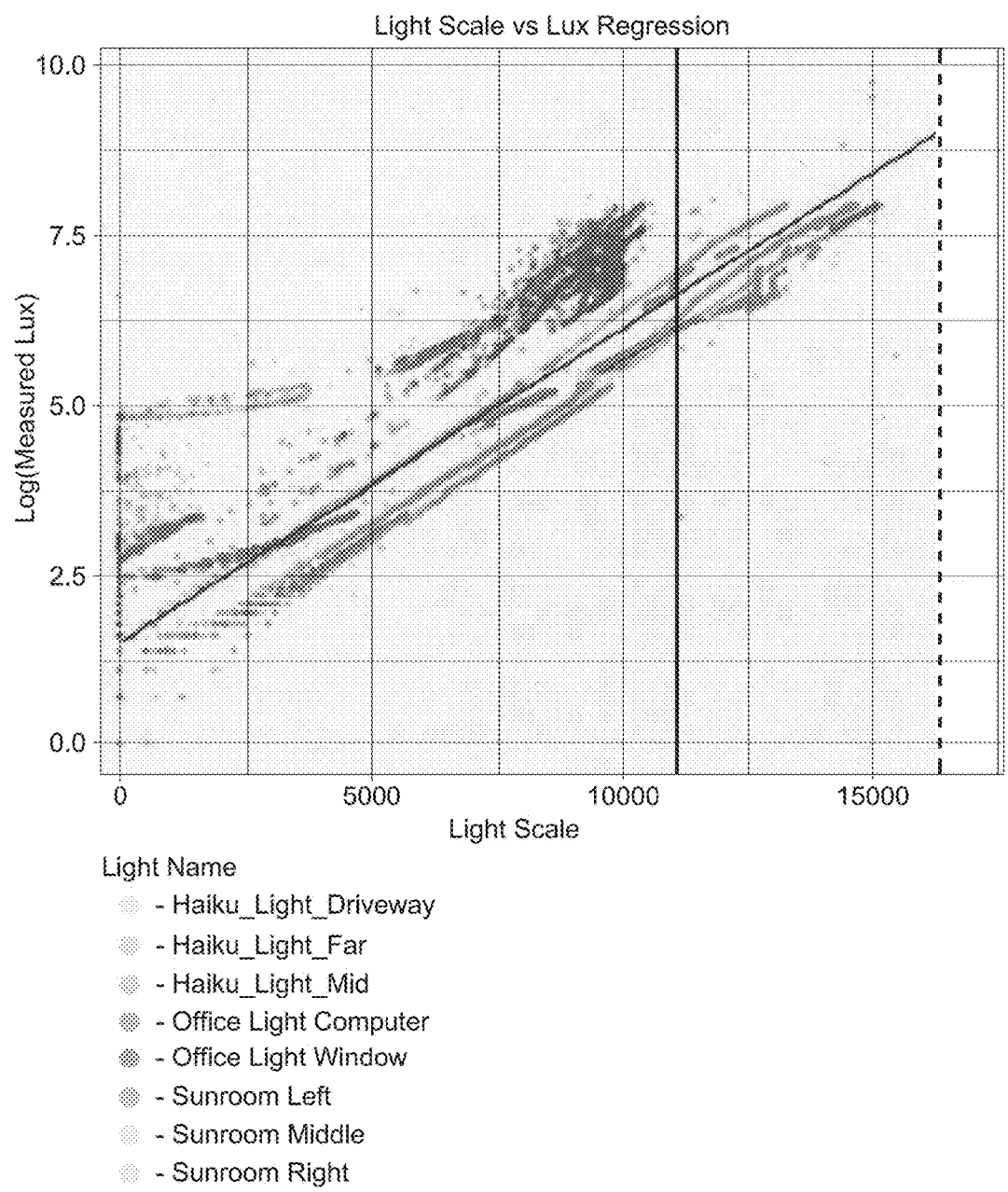
FIG. 3 is a graphical representation of the manner in which a light scale was determined using empirical data from a plurality of lights.
Figure 4:
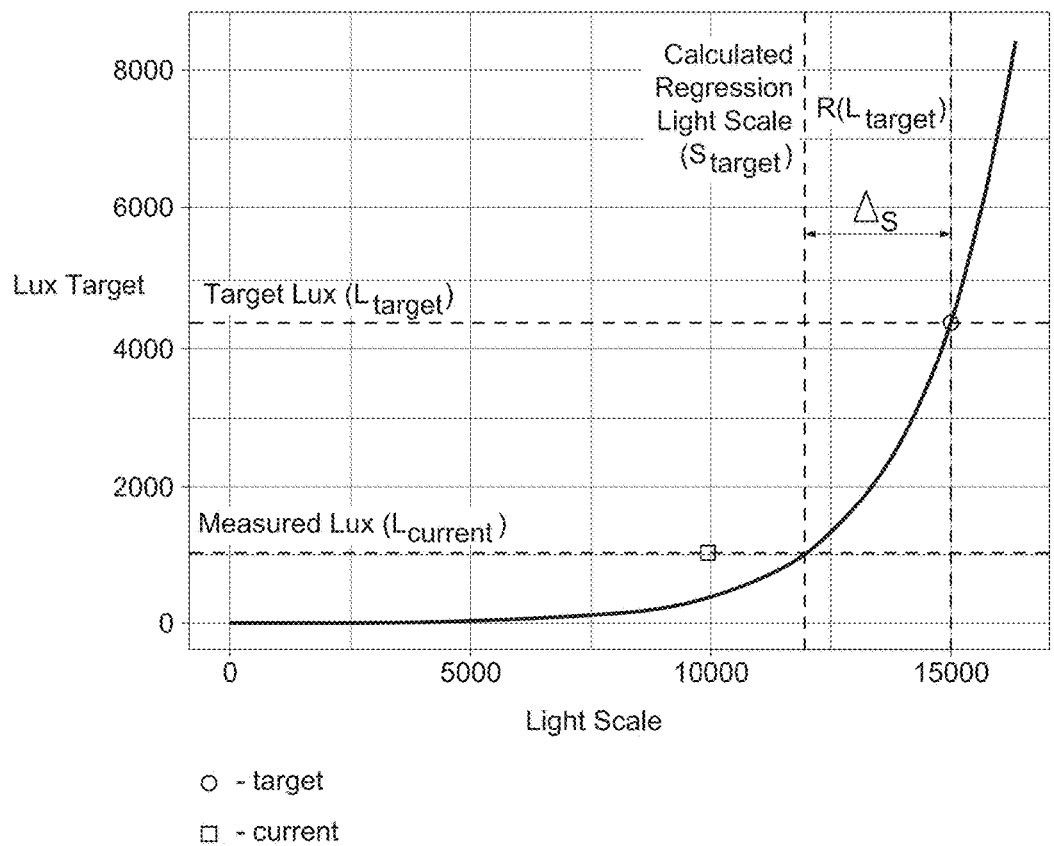
FIG. 4 is a graphical representation of the manner in which the incremental adjustment was determined.
Figure 5:
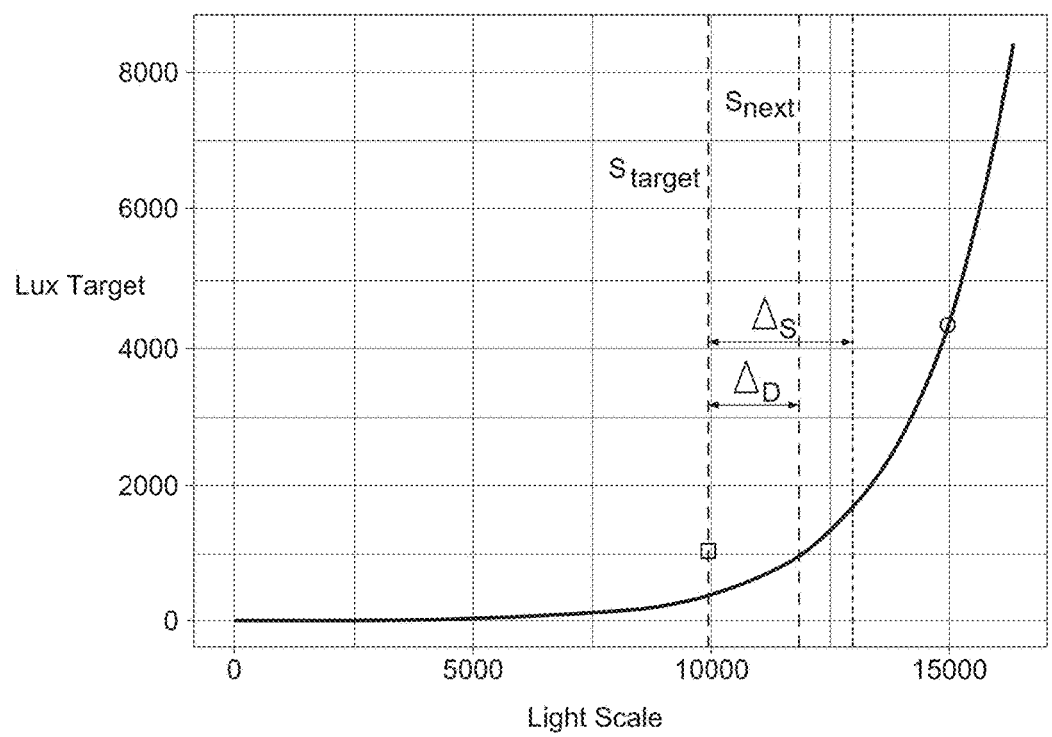
FIG. 5 is a graphical representation of the manner in which the damping factor was determined.

With further reference to FIGS. 3-5, an ideal or targeted light level may be determined as an initial step of the ALC implementation. To do so, a correlation between light output and measured light level L may be initially determined. This may be done via theoretical correlation or empirical data. In one aspect of the invention, the correlation between light output and measured light level L may be predetermined. In another aspect, the correlation between light output and measured light level L may be learned over time by the lighting system 10.

Light output may be characterized in a number of ways, including as a function of voltage and frequency. In the present description, light output may be expressed in terms of a "light scale." For the purposes of this disclosure, "light scale" S is a unit represented by a number, such as between 0 and 16,383 (inclusive). Each light scale value maps to a voltage and pulse width modulation (PWM) value to affect the light output of a light or group of lights, such as a group of LEDs. Light scales may be constructed such that changes in light scale values are linear with respect to human perception of light and logarithmic with respect to units of lux. Although the values of light scale units and integers of the equations in the present application are expressed according to the "light scale" as described above, it should be understood that the relationships between light output (whether expressed in terms of the "light scale" of this disclosure or in other terms quantifying light output) and related variables such as measured light level L are applicable across various manners of quantifying light output. In other words, in the event a light output is expressed according to a different quantification method than the "light scale" described above, the concepts described below and interactions between light output and measured light level still apply.

Referring now to FIG. 3, a plurality of lights under various environmental conditions were monitored, with respect to measured light level L. Based on these measurements, the following regression formula was obtained:

$$L \approx 3.155 e^{4.817E-4*S}$$

Similarly, the inverse of this function may be expressed as:

$$S \approx 2076 * \log(L) - 2385$$

These equations function as a correlation between light output (as expressed in terms of "light scale" S) and measured light level. Throughout the disclosure, this regression function may be referred to as R as follows:

$$R(L) = 2076 * \log(L) - 2385$$

$$R^{-1}(S) = 3.155 e^{4.817E-4*S}$$

Due to differences in ambient light conditions and surface treatments, the calculated regression function R may not correctly map light output to target light level. Therefore, it may be necessary to incrementally adjust the light output in order to reach the targeted light level. When the current light level ($L_{current}$), current light scale ($S_{current}$), and target light level ($L_{target}$) are known, the regression function R may be used to make more educated light output adjustments. For each iteration, the next light scale ($S_{next}$) may be determined using the following formula:

$$S_{next} = S_{current} + \Delta_S$$

Where the increment of change in light scale $\Delta_S$, is defined for each light within the system as:

$$R_{Target} = R(L_{Target})$$

$$R_{Current} = R(L_{Current})$$

$$\Delta_S = R_{Target} - R_{Current}$$

FIG. 4 provides a visual representation of one process for determining $\Delta_S$.

In some situations, as the current measured light level approaches the target light level, these incremental changes $\Delta_S$ may cause oscillation and/or flickering of the lights. Accordingly, an optional damping function D(x) may be utilized to minimize any such oscillation and/or flickering. This damping function D(x) may damp $\Delta_S$ values as they approach zero, but may leave $\Delta_S$ values over a given predetermined value uninhibited. In an illustrative example, the damping function may leave a given $\Delta_S$ over 5000 uninhibited. Expressed another way, the damping function may be utilized only when the change in light output is within approximately 30% of the maximum light output capability. The current invention contemplates the following damping function D(x) in this range:

$$D(x) = \min(1, (0.00018 * |x|) + 0.1)$$

where "x" is the change in light scale. Stated in another manner, the damping function D(x') may be expressed as:

$$D(x') = \min\left(1, \left(\frac{1}{(30\% \text{ of the max capability of light output})} * |x'|\right) + 0.1\right)$$

where x' is the change in light output.

Using this function, a new damped incremental change $\Delta_D$ may be calculated as follows:

$$\Delta_D = D(\Delta_S) * \Delta_S$$

Accordingly, when the value of $\Delta_S$ is below the given threshold, the next light scale ($S_{next}$) may be determined using the following formula:

$$S_{next} = S_{current} + \Delta_D$$

FIG. 5 illustrates the damping factor being used to calculate $\Delta_D$ and $S_{next}$ from $S_{current}$ and $\Delta_S$.

As an alternative to applying a damping function, the ALC feature may be implemented in a manner that restricts the maximum allowed value ("Max") on the increment $\Delta_S$. Accordingly, the light output cannot rise faster than Max_$\Delta_S$. In this manner, the maximum adjustment can be automatically controlled.

As noted above, the system 10 may include a plurality of lights or fixtures 12 to be adjusted under a given set of circumstances. In the case of multiple lights, the system 10 may allow for some choice to be made whether a given light has the individual freedom to independently adjust light output level in order to achieve the target light level, or if there should be some interdependence between lights. If each light is given full freedom to adjust its light output level independently, then the aesthetics of the lighting scheme may suffer, as some lights may dim to the point they may appear off in the presence of sufficient ambient light.

In order to address this aesthetic shortcoming, a control, termed an energy factor, ρ, may be utilized, which may serve to limit output differences between and/or among lights of a given group of lights. The energy factor, at its maximum, grants all lights full range of motion to achieve the target light level (thus achieving maximum potential energy savings). At its minimum, the energy factor forces all lights to adopt a particular light output level (such as that needed by the light in the darkest part of the room, or based on an average, scaled value, as noted further below).

Given n lights' outputs $S_1, S_2, \ldots S_n$, the energy factor ρ may be selected such that $\{\rho | 0 \le \rho \le 1\}$. Next, the maximum of all "desired" light output levels $S_{max}$ may be found:

$$S_{max} = \text{Max}(S_1, S_2, \ldots S_n)$$

Then, an adjusted light output level $S_{x'}$ may be calculated for each light, taking into account the maximum light output $S_{max}$ requested and the Energy Factor ρ:

$$S_{x'} = \text{Max}(S_x, S_{max} * (1-\rho))$$

Therefore, given ρ=0.5, all lights must have an output light scale level of no less than half the light output needed by the light in the darkest part of the room. Further, ρ=0.0 will force all lights to have the same output, and ρ=1.0 would allow each light to freely adjust the output level to reach the desired ambient light conditions.

Testing showed that a two-mode system may encompass most user preferences. In a "Balanced Mode," the energy factor ρ may be set to 0, indicating that the light output or light scale of each light is equal. In an "Energy-Saving Mode," the energy factor ρ may be greater than zero, thereby allowing some degree of independence between the lights within the room. In one embodiment, the "Energy-Saving Mode" may set the energy factor ρ to 0.2.

Figure 6:
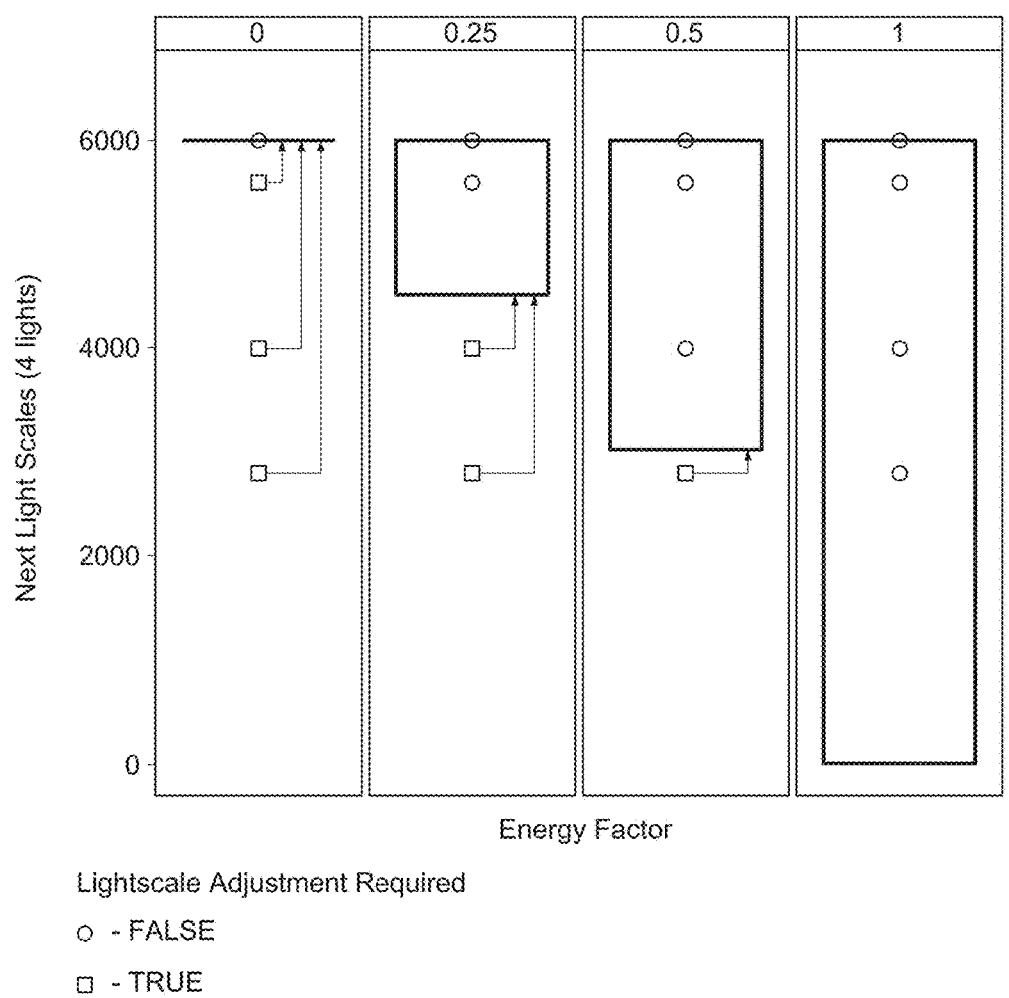
FIG. 6 is an illustration of the manner in which the energy factor may be applied to a plurality of lights.
Figure 7:
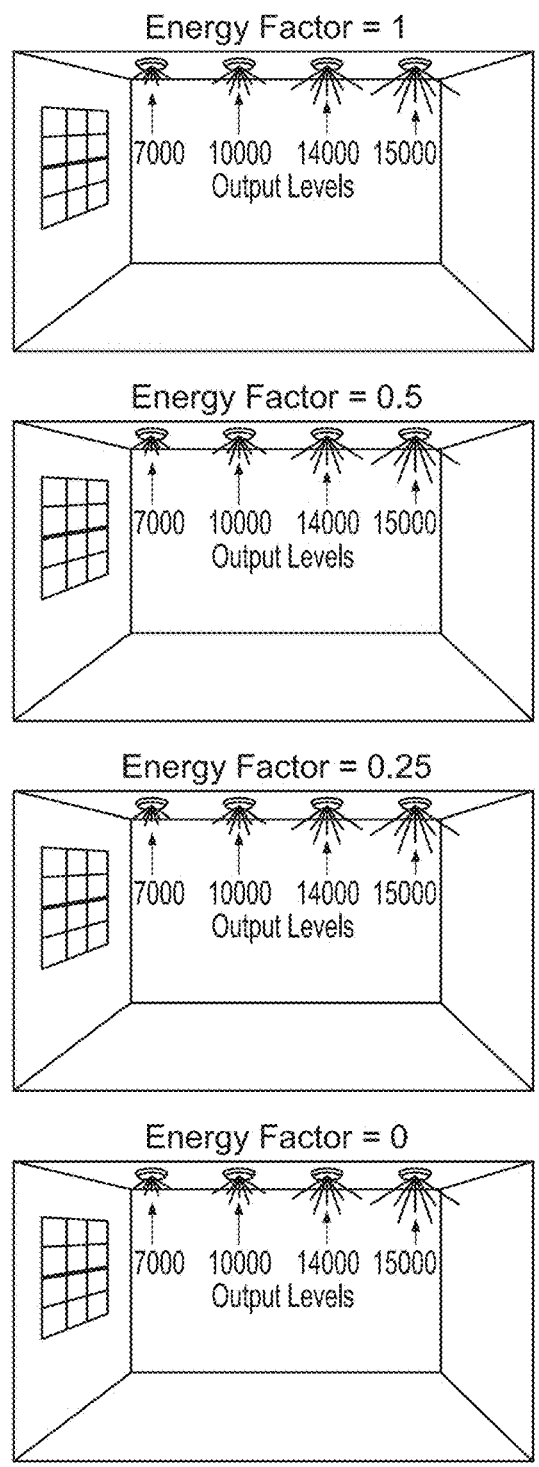
FIG. 7 is an actual depiction of the application of the energy factor.

As an example, FIGS. 6 and 7 illustrate how light scale values would need to be altered as a result of the energy factor. In the illustrated example, four lighting fixtures 12 are present in a space or room, each with a different targeted $S_{next}$ value (15000, 14000, 10000, and 7000, respectively). Those lighting fixtures that need to be altered would be moved to the lower bound of the bounding box shown in gray. FIG. 7 shows the same data in a visual format.

As noted above, it may be aesthetically pleasing to ensure that every light controlled by the system 10 remains at a minimum light output level so that it does not appear as if some lights are on while others are off. Otherwise, the user may be confused as to whether a very-dimly-lit lighting fixture has been turned off by the user, or if it is simply compensating for a sufficiently bright room. This global minimum output may be a function of the brightness of the room, which may correspond to the measured light in the darkest part of the room $L_{min}$.

$$L_{min} = \text{Min}(L_1, L_2, \ldots L_n)$$

The resulting minimum measured light level $L_{min}$ can be associated to a calculated output light level $S_{calc}$ by the function R:

$$S_{calc} = R(L_{min})$$

The important values of $S_{calc}$ are those which are less than or equal to the maximum light output, as any $S_{calc}$ above the maximum output would be irrelevant. As an example, the $S_{max}$ for a given light fixture may be $S_{max}$=16383 light scale units. The corrected light level $S_{corrected}$ may be represented as follows:

$$S_{corrected} = \text{Min}(S_{max}, S_{calc})$$

In one aspect, the global minimum light scale value $S_{global\,min}$ may be set to 25% of $S_{corrected}$ in order to be set at a light level which makes it obvious that the light is on, even though ALC feature is active:

$$S_{global\,min} = 0.25 * S_{corrected}$$

This global minimum may ensure that every light in a system of lights remains lit to at least some acceptable minimal degree, such as for aesthetic purposes.

In another aspect of the disclosure, custom controls may be provided which may allow the user to select a target light level percentage. When the user makes a change to the target light level, the ALC algorithm may stop acting until the user has finished making his or her changes. The light scale for a given selected level $S_x$ $\{x | 1 \le x \le 100\}$ may be given by:

$$S_x = 165.5 * x - 164.5$$

In the context of this equation, light levels were selectable as a log of predicted illumination levels, since that is how the human brain perceives light intensity. The new light scale estimation is then calculated following user selection and the algorithm continues as normal.

Upon enablement of the ALC feature, a new target light level may be calculated in order to maintain a light level similar to the current space or room conditions. Thus, if the energy factor is zero ($\rho=0$, i.e. in the "Balanced Mode"), the light output should not change at the moment the ALC feature is enabled. In order for the level to remain approximately the same, the maximum requested light output (e.g. the light output requested by the light in the darkest part of the room) should be approximately equal to the light output which was active before enabling the ALC feature. Therefore, the algorithm should measure the current light from all the grouped lights, and use the minimum as the new light target:

$$L_{target} = \text{Min}(L_1, L_2, \ldots L_n)$$

Conversely, disabling of the ALC feature may have an inverse effect. For example, it may be desirable to select a new light output that remains constant regardless of ambient light conditions. In the context of the "Balanced Mode," the new output level setting $S_{new}$ may be equal to the current output setting upon disablement. In the context of the "Energy-Saving Mode," the new output level setting $S_{new}$ for all lights may be set to match the maximum light output of all lights at the time the ALC algorithm is disabled.

$$S_{new} = \text{Max}(S_1, S_2, \ldots S_n)$$

As an alternative approach, each measured light level from a group of lights may be converted to a scale value using the formula:

$$S_i = S(L_i)$$

This conversion may be done for each light or fixture 12 in the group. All scaled values may then be averaged across all lights in the group, and the resulting $S_{avg}$ value may be used as the "effective current scale" for the group. This value would be the group's "target effective scale," and the new target light output may be calculated as:

$$L_{target} = L(S_{avg})$$

In a further aspect of the disclosure, the system may not require any central controller 14 for coordinating control of a plurality of lights or fixtures 12. In order for the system 10 to operate without such a central controller, each light within the system 10 may broadcast its own next calculated light level $S_{next}$ and receive the $S_{next}$ for every other light in the group. Each light may then determine the highest target light level in the group, and may make its own decision as to how to incrementally change light output according to the method outlined above. If a change is made to the energy factor by the user, such change must be received by each light or fixture 12 in the group. The lights may then confirm amongst themselves that the factor has changed, but each new setting of a new light output by each light fixture need not necessarily be broadcast.

Having shown and described various embodiments, further adaptations of the apparatuses, methods and systems described herein may be accomplished by appropriate modifications by one of ordinary skill in the art without departing from the scope of the disclosure. Several of such potential modifications have been mentioned, and still others will be apparent to those skilled in the art. Accordingly, the scope of the disclosure should be considered in terms of claims that may be presented, and is understood not to be limited to the details of structure and operation shown and described in the specification and drawings.

The invention claimed is:

1. A lighting system, comprising:
a plurality of lights;
a sensor for measuring a light level associated with each light; and
at least one controller for generating a light output from at least one light of the plurality of lights, and for adjusting the light output from the at least one light by an incremental amount to bring the measured light level closer to a target light level;
wherein the controller is adapted for determining a global minimum light output, and adjusting the light output for the at least one light to be greater than the global minimum light output.

2. The system of claim 1, wherein the target light level is provided to the controller by a user.

3. The system of claim 1, wherein the controller generates the light output based on a correlation between the measured light level and light output.

4. The system of claim 1, wherein each of the plurality of lights includes a controller for generating the light output from an associated light, and adjusting the light output from the associated light by an incremental amount to bring the measured light level closer to the target light level.

5. The system of claim 1, wherein the target light level is a room brightness.

6. A method of controlling a light, comprising:
providing a target light level;
obtaining a measured light level associated with the light;
adjusting the light output from the light by an incremental amount to bring the measured light level closer to the target light level; and
adjusting the incremental amount by multiplying the incremental amount by a damping factor when a difference between the measured light level and the targeted light level falls below a predetermined value.

7. The method of claim 6, further including the step of initiating a light output from the light based on a correlation between a measured light level and light output.

8. The method of claim 6, wherein the adjusting step comprises continuously adjusting the light output by a series of incremental amounts.

9. The method of claim 6, wherein the predetermined value is approximately 30% of a maximum light output capability.

10. The method of claim 9, wherein the damping factor is defined as the minimum of 1 and the following function:

$$\left( \frac{1}{(30\% \text{ of maximum light output capability})} * |x| \right) + 0.1$$

where "x" is the incremental amount.

11. The method of claim 6, wherein the step of providing the target light level comprises providing a room brightness.

12. A method of controlling a plurality of lights in a space, comprising:
providing a target light level;
initiating a first light output from each of the plurality of lights based at least in part on a correlation between measured light level and light output;
determining a measured light level at each of the lights; and
determining a nominal light output for each of the plurality of lights needed to bring the measured light level at the plurality of lights closer to the target light level.

13. The method of claim 12, further including the step of determining the nominal light output by increasing the first light output by an incremental amount, wherein the incremental amount is a difference between a light output correlating to the target light level and a light output correlating to the measured light level.

14. The method of claim 12, further including the steps of:
- determining a maximum of the nominal light outputs from the plurality of lights; and
- initiating a second light output from each of the lights, each of said second light outputs being a maximum of the nominal light output for each of said plurality of lights and a predetermined fraction of the maximum nominal light outputs.

15. The method of claim 12, further including the steps of:
- determining a global minimum light output; and
- adjusting an initiated first light output or a second light output to be no less than the global minimum light output.

16. The method of claim 15, wherein the global minimum light output is a function of the measured light level.

17. The method of claim 15, wherein the global minimum light output is a function of an average light output for the plurality of lights.

18. The method of claim 15, wherein the steps of providing a target light level comprises providing a room brightness.

* * * * *